United States Patent
Lin

(10) Patent No.: US 9,667,413 B2
(45) Date of Patent: May 30, 2017

(54) ENCRYPTION REALIZATION METHOD AND SYSTEM

(71) Applicant: ZTE CORPORATION, Shenzhen, Guangdong Province (CN)

(72) Inventor: Yan Lin, Shenzhen (CN)

(73) Assignee: ZTE CORPORATION, Shenzhen, Guangdong Province (CN)

( * ) Notice: Subject to any disclaimer, the term of this patent is extended or adjusted under 35 U.S.C. 154(b) by 0 days.

(21) Appl. No.: 14/429,833

(22) PCT Filed: Aug. 15, 2013

(86) PCT No.: PCT/CN2013/081541
§ 371 (c)(1),
(2) Date: Mar. 20, 2015

(87) PCT Pub. No.: WO2013/185735
PCT Pub. Date: Dec. 19, 2013

(65) Prior Publication Data
US 2015/0256335 A1 Sep. 10, 2015

(30) Foreign Application Priority Data

Sep. 20, 2012 (CN) .......................... 2012 1 0351671

(51) Int. Cl.
*H04L 9/32* (2006.01)
*H04L 9/08* (2006.01)
(Continued)

(52) U.S. Cl.
CPC .............. *H04L 9/0819* (2013.01); *H04L 9/12* (2013.01); *H04L 9/14* (2013.01); *H04L 9/3234* (2013.01);
(Continued)

(58) Field of Classification Search
None
See application file for complete search history.

(56) References Cited

FOREIGN PATENT DOCUMENTS

| CN | 101030854 A | 9/2007 |
|----|-------------|--------|
| CN | 101132649 A | 2/2008 |

(Continued)

OTHER PUBLICATIONS

English Abstract translation of CN101511084 (Published Aug. 19, 2009).

(Continued)

*Primary Examiner* — David Le
(74) *Attorney, Agent, or Firm* — McClure, Qualey & Rodack, LLP

(57) ABSTRACT

An encryption realization method and system are disclosed. The method includes: a network-side device and a group call terminal maintaining the same list of push-to-talk (PTT) authentication key K values respectively; during each group call, the network-side device calculating an authentication vector (AV) according to a generated random number (RAND), an authentication sequence number (SQN), a PTT authentication key K value selected from the list of PTT authentication key K values and public network authentication functions; and according to the RAND and an authentication token (AUTN) in the AV acquired from the network-side device, the group call terminal performing authentication to generate an cipher key (CK). With the method and system according to the embodiments of the present invention, the encryption of the PTT system based on the security mechanism of the public network can be achieved, and drawbacks in the related that that the encryption of the PTT system depends on the private encryption algorithm which has a low intensity, the key is transmitted via an air interface, and the replacement of the key is not in (Continued)

time are solved, thereby largely improving the security of the PTT system.

20 Claims, 3 Drawing Sheets

(51) Int. Cl.
 *H04L 9/14*  (2006.01)
 *H04W 4/10*  (2009.01)
 *H04W 12/06*  (2009.01)
 *H04L 9/12*  (2006.01)
 *H04W 12/04*  (2009.01)
 *H04W 84/08*  (2009.01)
 *H04W 12/02*  (2009.01)

(52) U.S. Cl.
 CPC ............. *H04W 4/10* (2013.01); *H04W 12/06* (2013.01); *H04L 2209/24* (2013.01); *H04L 2209/80* (2013.01); *H04W 12/02* (2013.01); *H04W 12/04* (2013.01); *H04W 84/08* (2013.01)

(56) References Cited

FOREIGN PATENT DOCUMENTS

CN 101511084 A 8/2009
CN 103179558 A 9/2012

OTHER PUBLICATIONS

Full English machine translation of CN101132649 (Published Feb. 27, 2008).
English Abstract translation of CN103179558 (Published Sep. 20, 2012).
English Abstract translation of CN101030854 (Published Sep. 5, 2007).
International Search Report for PCT/CN2013/081541.

ENCRYPTION REALIZATION METHOD AND SYSTEM

TECHNICAL FIELD

The present invention relates to the field of communication technology, and in particular, to an encryption realization method and system.

BACKGROUND OF THE RELATED ART

Push-to-talk (PTT) communication services are half duplex two-way services, which are used to implement one-to-many services, and have the following characteristics: when a PTT terminal initiates a PTT call service, voice information thereof can simultaneously be transmitted to all members within a preset PTT group, and services can be set up rapidly. Based on these characteristics, the PTT communication system is widely used in industries and occasions such as government agency, public security and fire control, energy and transportation, airport and seaport, industrial and mining enterprises, military and exhibition etc.

The current PTT communication system is developed based on the second generation mobile communication technology, i.e., the Global System For Mobile Communication (GSM) technology. In addition, with the increasing mature and commercial popularization of the new mobile communication technology, the PTT communication system will evolve to a system which adopts a communication technology such as the 3nd Generation (3G) communication technology or 4th Generation (4G) communication technology etc., since the use of the more advanced communication technology is the evolution direction of the PTT communication services.

In addition, most scientific research institutions also study a subject of how to combine the PTT communication system with a public network, wherein, when the PTT communication system is combined with the public network, how to make use of the mature public security architecture of the public network to implement security of PTT communication is a problem to be solved.

However, the encryption method of the PTT communication system in the related art is not based on the security architecture of the public network, which is primarily achieved in the following several types of manners:

1. Using an end-to-end encryption method. A general encryption module is added in the terminal, and no matter whether the terminal is an encryption terminal or a decryption terminal, the same encryption/decryption algorithm and key are used. When the method is applied, the key is transmitted via an air interface, and the security completely depends on the complexity of the encryption algorithm. Therefore, in a practical implementation process, if the intensity of the encryption algorithm is not enough, the encryption algorithm is easy to be broken, which results in poor security.

2. A key management center allocates multiple fixed keys dedicated to PTT communication services to the terminal, and each key is represented by a unique key identity. These fixed keys may be written into a user identification card of the terminal by a card read/write device. In the PTT group call services, the network side device controls the terminal to use a particular key through the key identity. However, in the practical application process, as a number of the keys is limited, it will result in repeated use of the keys, which will largely reduce the security of the PTT communication system, and as the keys in the user identification card of the terminal need to be written by a particular card read/write apparatus, it is disadvantage for subsequent timely update of the keys.

3. The key management center generates a new key. In consideration of the security problem, the key cannot be directly transmitted through an air interface message. Therefore, in the group call process, the new key is encrypted by using a key which is negotiated between a particular terminal and the network side device, to obtain Keycipher, and Keycipher is transmitted through an air interface message. The key which is negotiated between the network side device and the terminal may be a key which is currently used, or may also be a key which is fixedly used by a particular PTT group etc. The terminal uses the key which is negotiated to decrypt Keyciper in the air interface message, to obtain the newly generated key to substitute the key which is currently used. However, in the practical application, the security of the new key also depends on the security of the key which has been negotiated. Therefore, the security cannot be ensured to some extent.

In addition, a feature of the PTT group call service is that a voice of a calling user can be received by multiple listening users in the same group at the same time. In a practical implementation, if a set of resources are allocated to each listening user to implement the group call function, an encryption mechanism of the public network can be directly used to implement encryption of the group call, but there will be a large number of network resources which are occupied by one group call. In addition, the encrypted key generation and use mechanism of the public network is only suitable for a single user. If the same set of keys is to be generated and used by users in the same group call, it needs to implement by a new set of mechanisms.

SUMMARY OF THE INVENTION

The embodiments of the present invention provide an encryption realization method and system, to solve the problem in the related art that the encryption of the PTT system depends on the private encryption algorithm which has a low intensity, the key is transmitted via an air interface, and the replacement of the key is not in time etc.

The embodiments of the present invention provide an encryption realization method, comprising:

a network-side device and a group call terminal maintaining the same list of PTT authentication key K values respectively;

during each group call, the network-side device calculating an authentication vector (AV) according to a generated random number (RAND), an authentication sequence number (SQN), a PTT authentication key K value selected from the list of PTT authentication key K values and public network authentication functions; and according to the RAND and an authentication token (AUTN) in the AV acquired from the network-side device, the group call terminal executing authentication to generate a cipher key (CK).

Alternatively, the group call terminal comprises a talking-state terminal and a listening-state terminal, which share a downlink dedicated physical channel and have the same configuration of link layer resource, and an uplink dedicated physical channel is allocated to the talking-state terminal of the PTT group call.

Alternatively, the listening-state terminal only receives a downlink service and signaling data on an unacknowledge mode radio bearer (UM RB) on the downlink dedicated physical channel, and can also receive service data in a transparent transmission mode for a universal mobile telecommunications system (UMTS), and the uplink signaling of the listening-state terminal is transmitted on a public channel which is not encrypted and decrypted.

Alternatively, the method further comprises: the group call calling user initiating group call establishment;

wherein, the step of the group call calling user initiating group call establishment comprises:

the group call calling user transmitting a group call establishment request to a PTT server;

after receiving the group call establishment request transmitted by the group call calling user, the PTT server generating parameters required for a public network authentication algorithm for the group call, wherein, the parameters comprise the RAND, the SQN, and a K value randomly selected from the list of PTT authentication key K values; and calculating the AV using the public network authentication functions f1-f5 and transmitting the AV and an identity ($K_{id}$) of the selected K value to a serving radio network controller (SRNC) or an evolved NodeB (eNB) of the group call calling user;

the SRNC or the eNB transmitting the $K_{id}$ of the K value, the RAND, and the AUTN in the AV to the group call calling user; and the group call calling user generating the CK according to the received $K_{id}$, RAND, and AUTN in the AV.

Alternatively, the method further comprises: the PTT server initiating a group call called process;

wherein, the step of the PTT server initiating a group call called process comprises:

the PTT server determining a page transmission range according to a location area where the group call called user is located, notifying a radio network controller (RNC) or eNB in the range, and transmitting the $K_{id}$, the RAND, and the AUTN in the AV which are transmitted to the group call calling user to the SRNC or eNB;

the SRNC or eNB broadcasting configuration of the current group call listening state on a pre-assigned PTT dedicated public channel of all cells, wherein, the configuration comprises link layer resource, physical resource, the RAND, and the AUTN in the AV sent by the PTT server; and after receiving a page, when judging that it needs to enter the group call listening state, the group call called user actively reading the $K_{id}$ and the AUTN in the AV of the group call calling user on the public channel, and performing authentication and generating the CK.

Preferably, the method further comprises: a group call called user, which is in a power-off state or a state of being not in a group call service area when the group call is established, entering a group call listening state and starting the encryption step;

wherein, the step of a group call called user which is in a power-off state or a state of being not in a group call service area entering a group call listening state and starting encryption comprises:

after the group call called user which is in a power-off state or a state of being not in a group call service area when the group call is established being powered on or entering a PTT service area, transmitting a group information update request to the PTT server to acquire an identity of a group call to which the terminal belongs, and when the group call called user determines that it needs to answer a particular group call, reading the PTT dedicated public channel and acquiring information of the group call to which it belongs, wherein, the information of the group call to which it belongs comprises a downlink physical channel of the group call, the link layer resource, the $K_{id}$, the RAND and the AUTN in the AV, and performing authentication based thereon.

Alternatively, decryption parameters of all listening user terminals in the same group call are the same, and when authentication is performed, in addition to generating the same CK, synchronization of an encryption counter (COUNT-C) value of every listening user terminal needs to be ensured; and the method further comprises:

the SRNC or eNB updating a hyper frame number (HFN) value of the downlink COUNT-C of a RB in real time; and the SRNC or eNB broadcasting an encryption indication of the current group call on the PTT dedicated public channel, to notify the group call called user whether the group call needs to be encrypted.

Alternatively, when deciding to enter a listening state, the group call called user reading encryption parameters comprising the encryption indication of the group call, the HFN, the encryption algorithm etc. on the PTT dedicated public channel;

when the encryption indication is no encryption, not starting the encryption flow; and when the encryption indication is starting encryption, initializing the COUNT-C using the downlink HFN of the RB broadcasted, setting a serial number (SN) to 0, and a connection frame number (CFN) part of an integrity protection counter (COUNT-I) of the RB in a transparent transmission mode in the UMTS system using the current CFN.

The embodiments of the present invention further provide a network-side device, comprising: a PTT server, and a serving radio network controller (SRNC) or an evolved NodeB (eNB), the PTT server is configured to: maintain a list of PTT authentication key K values, generate a random number (RAND) and an authentication serial number (SQN), and during each group call, calculate an authentication vector (AV) according to the RAND, the SQN, a PTT authentication key K value selected from the list of PTT authentication key K values and public network authentication functions, wherein the list of PTT authentication key K values is the same as that maintained by a group call terminal; and the SRNC or eNB is configured to transmit the RAND, the SQN and the AV generated by the PTT server to the group call terminal.

Alternatively, the PTT server is configured to: after receiving a group call establishment request transmitted by the group call calling user, generate parameters required for a public network authentication algorithm for the group call, wherein, the parameters comprise the RAND, the SQN, and a K value randomly selected from the list of PTT authentication key K values, and calculate the AV using the public network authentication functions f1-f5 and transmit the AV and an identity ($K_{id}$) of the selected K value to the SRNC or eNB; and the SRNC or eNB is configured to transmit the acquired $K_{id}$ of the K value, the RAND, and an authentication token (AUTN) in the AV to the group call calling user.

Alternatively, the PTT server is further configured to: after the group call calling flow is successful, determine a page transmission range according to a location area where the group call called user is located, notify a radio network controller (RNC) or eNB in the range, and transmit the $K_{id}$, the RAND, and the AUTN in the AV which are transmitted to the group call calling user to the SRNC or eNB; and the SRNC or eNB is further configured to broadcast configuration of the current group call listening state on a pre-assigned PTT dedicated public channel of all cells, wherein, the configuration comprises link layer resource, physical resource, the RAND, and the AUTN in the AV sent by the PTT server.

Alternatively, the SRNC or eNB is further configured to: update an HFN value of a downlink COUNT-C of an RB in real time; and broadcast an encryption indication of the current group call on the PTT dedicated public channel, to notify the group call called user whether the group call needs to be encrypted.

The embodiments of the present invention further provide a group call terminal, configured to: maintain a list of PTT authentication key K values, and according to the generated random number (RAND) and authentication token (AUTN) in an authentication vector (AV) acquired from the network-side device, perform authentication to generate an cipher key (CK).

wherein, the list of PTT authentication key K values is the same as that maintained by the network-side device.

Alternatively, the group call terminal comprises a talking-state terminal and a listening-state terminal, which share a downlink dedicated physical channel and have the same link layer configuration, and an uplink dedicated physical channel is allocated to the talking-state terminal of the PTT group call.

Alternatively, the listening-state terminal only receives a downlink service and signaling data on an unacknowledge mode radio bearer (UM RB) on the downlink dedicated physical channel, and can also receive service data in a transparent transmission mode for a universal mobile telecommunications system (UMTS), and the uplink signaling of the listening-state terminal is transmitted on a public channel which is not encrypted and decrypted.

Alternatively, the group call terminal comprises a group call calling user and a group call called user, wherein, the group call calling user is configured to generate the CK according to the received $K_{id}$, RAND, and the AUTN in the AV; and the group call called user is configured to: when determining to enter the group call listening state, actively read the $K_{id}$, the RAND and the AUTN in the AV of the group call calling user on the public channel, perform authentication, and generate the CK.

Alternatively, the group call called user is further configured to after being powered on or entering a PTT service area, transmit a group information update request to the PTT server to acquire an identity of a group call to which the terminal belongs, and when the terminal determines that it needs to answer a particular group call, read the PTT dedicated public channel, and acquire information of the group call to which it belongs, wherein, the information of the group call to which it belongs comprises a downlink physical channel, link resource configuration, the $K_{id}$, the RAND and the AUTN in the AV of the group call; and perform authentication based thereon.

Alternatively, decryption parameters of all listening user terminals in the same group call are the same, and when authentication is performed, in addition to generating the same CK, synchronization of an encryption counter (COUNT-C) value of every listening user terminal needs to be ensured.

Alternatively, the group call called user is further configured to: when deciding to enter a listening state, read encryption parameters comprising the encryption indication of the group call, the hyper frame number (HFN), the encryption algorithm etc. on the PTT dedicated public channel;

when the encryption indication is no encryption, not start the encryption flow; and when the encryption indication is starting encryption, initialize the COUNT-C using the downlink HFN of a RB broadcasted, set a serial number (SN) to 0, and a connection frame number (CFN) part of COUNT-I of the RB in a transparent transmission mode in a UMTS system uses the current CFN.

With the method and system according to the embodiments of the present invention, the encryption of the PTT system based on the security mechanism of the public network can be achieved, and drawbacks in the related that that the encryption of the PTT system depends on the private encryption algorithm which has a low intensity, the key is transmitted via an air interface, and the replacement of the key is not in time are solved, thereby largely improving the security of the PTT system.

PREFERRED EMBODIMENTS OF THE PRESENT INVENTION

Figure 1:
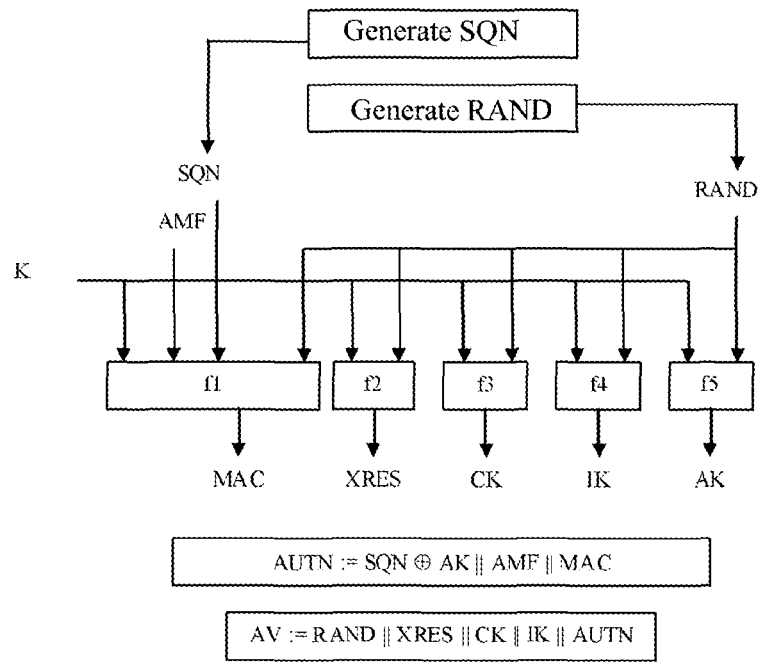
FIG. 1 is a diagram of a generation algorithm of a public network authentication vector.

The technical schemes according to the embodiments of the present invention will be further described in detail below in conjunction with accompanying drawings. It should be illustrated that without a conflict, the embodiments in the present application and the features in the embodiments may be combined with each other randomly.

In the current 3G security architecture, the key is not directly transmitted via the air interface, and instead, the key is generated through an authentication process. In view of this, the authentication center and the Universal Subscriber Identity Module (USIM) card store the same K value of 128 bit respectively, the authentication vector is transmitted via the air interface, and the authentication center and the USIM card use the same algorithm to calculate an Integrity Key (IK) and a Cipher Key (CK). By using the public encryption algorithm, the key of 128 bit largely enhances the capability of the key against an exhaustive attack. In addition, a number of using the key is counted by a counter (COUNT-C), and once a predetermined threshold is exceeded, the key will be replaced in time. The authentication and key negotiation process of 4G is completely the same as that of 3G. Therefore, if the PTT communication system can solve the problem that the transfer of the key via the air interface is not secure and the key cannot be updated in time by using the mature encryption mechanism of 3G or 4G.

In the encryption realization method based on a public network (for example, a Universal Mobile Telecommunications System (UMTS) or a Long Term Evolution (LTE))

according to the embodiment of the present invention, the PTT system has the following features:

In order to save the overhead of the physical resources of the PTT group call, all members of the PTT group call, including a talking-state terminal and a listening-state terminal of the PTT group call, share the downlink dedicated channel, have the same configuration of the link layer, and an uplink dedicated physical channel is allocated to the talking-state terminal of the PTT group call. The uplink and downlink signaling of the talking-state terminal both can be transmitted and received on the dedicated channel. The listening-state terminal only receives services and signaling data on an unacknowledge mode radio bearer (UM RB) on the dedicated channel, and the uplink signaling of the listening-state terminal is transmitted on a public channel. The pubic channel under the UMTS/LTE is not encrypted and decrypted. The resources of the listening-state terminal of the PTT group call are broadcast on the pre-assigned public channel.

All members of the PTT group call use the same PTT authentication key K value and authentication vector, and use the key generation algorithm of the public network, so that all members of the PTT group call can generate the same CK. It should be noted that the PTT authentication key K value here is different from the K value in the USIM card of the public network, and is a K value dedicated to the PTT system and is shared by all members of the group call. The PTT authentication key K value cannot be transmitted via an air interface, is pre-written into the USIM card, and may be a PTT authentication key K value which is fixedly allocated to each PTT group call, or may also be a fixed group of PTT authentication key K values. Which PTT authentication key K value to use is indicated by a particular identity parameter in the authentication vector.

In the embodiment of the present invention, the encryption/decryption algorithm of the PTT group call still uses the encryption/decryption algorithm of UMTS/LTE, the use and maintenance of the encrypted incoming parameter COUNT-C value in the PTT system need to be changed, and the difference from the use of the COUNT-C value of the public network is that all listening-state terminals of the PTT group call use the same COUNT-C value on the same downlink data packet for decryption. The update rule and use of the COUNT-C in the UMTS/LTE system is in accordance with the protocol, which will not be described here.

For the UMTS system, it should be additionally noted that as authentication is performed to generate a new key in each group call establishment process, and therefore, when the encryption is started, it is considered that START=0, i.e., the Hyper Frame Number (HFN) part of the COUNT-C value is initialized with 0, and the maintenance of the Serial Number (SN) or CFN part is still in accordance with the maintenance rule of the UMTS. For the group call called terminal which accesses later, as the time when the group call is accessed is unknown, in order to maintain the downlink COUNT-C value of the group call called terminal which accesses later to be the same as those of the group call called terminals in the group call, the Radio Network Controller (RNC)/eNB is responsible for updating the HFN of the downlink COUNT-C value on the PTT dedicated public channel in real time.

The encryption realization method based on the UMTS/LTE network security architecture of the public network according to the embodiment of the present invention is suitable for sharing the same set of downlink resources by all called terminals of the PTT group call, which include physical channels, and link layer resources.

Figure 3:
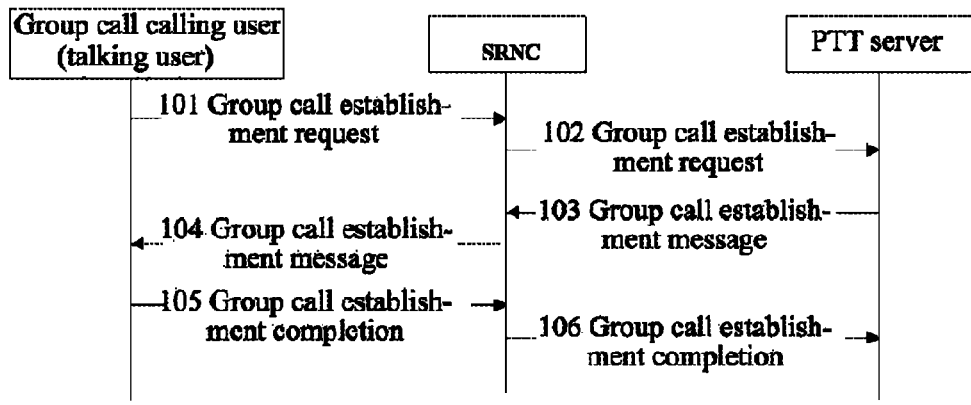
FIG. 3 is a diagram of a group call establishment process according to an embodiment of the present invention.

In the embodiment of the present invention, the group call establishment process is shown in FIG. 3, which comprises the following implementation steps.

In step 101, a group call calling user transmits a group call establishment request to an SRNC/eNB, the group call establishment request including a User Equipment (UE) identity of the group call calling user and a group identity of the group call needed to be established.

In step 102, the SRNC/eNB notifies the PTT server that the calling user requests for establishing a group call, and if the PTT server judges that the user has the access to establish the group call of the group call identity, it needs to generate an authentication vector for use by the group call, to generate a CK.

The PTT server and the PTT dedicated USIM card maintain the same list of PTT authentication key K values respectively. Each PTT authentication key K value is still 128 bit, and is identified by a natural number $K_{id}$. When the PTT server sends an authentication vector, it needs to carry $K_{id}$ to notify the USIM card which PTT authentication key K value to use. A number of PTT authentication key K values of the group call is set as needed, and the PTT authentication key K value is written into the USIM card using a card reader/writer.

Figure 2:
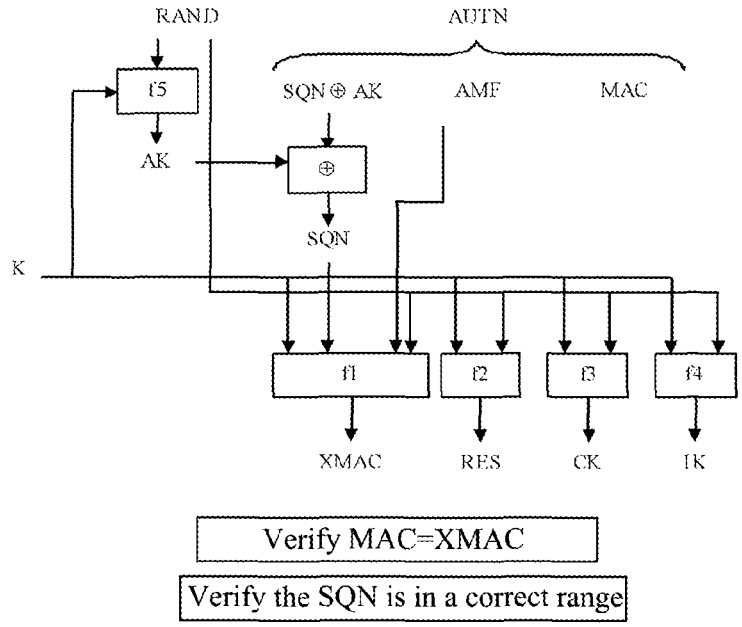
FIG. 2 is a diagram of user authentication in a USIM card under a public network.

The PTT server generates a random number RAND and an SQN of the group, and randomly selects a PTT authentication key K value from the list of PTT authentication key K values dedicated to the PTT. As shown in FIG. 1, a Message Authentication Code (MAC), an EXpected user RESponse (XRES), a CK, an IK, an Anonymity Key (AK) are calculated respectively according to the public network authentication functions f1-f5 respectively, wherein, the public network authentication functions f1-f5 are algorithm functions specified by the original protocol (3GPPTS33.102V7.1.0(2006-12) protocol). The PTT server transmits the calculated Authentication Vector (AV) to the SRNC where the group call calling user is located. The AV includes RAND, XRES, CK, IK, and AUTN, wherein, the constitution of AUTN is shown in FIG. 2, AUTN:=SQN⊕AK∥AMF∥MAC, and an Authentication Management Field (AMF) has a length of 16 bit, which is specified by the PTT server. At present, 8-15 bit of the public network may be used for private use, and for the PTT system, several bits may be selected therefrom for indicating the $K_{id}$ selected by the PTT server.

In the authencation process of the public network, a Home Location Register (HLR) or an Authentication Center (AUC) will maintain a serial number SQNHE for each user, and each USIM card maintains a serial number SQNMS, the SQNMS represents a maximum serial number which has been accepted by the USIM. The AV sent by the network side device carries SQNHE, and the USIM card compares the SQNHE with the SQNMS, and if the difference therebetween is in a particular range, it is considered that the USIM card is accpetable. For the group call services, if the SQNHE and the SQNMS are maintained for each group call during maintenance, when a particular listening user is not in the range of the current group call region or is in a powered off state, when the user enters the range of the group call region, the difference between the SQNHE and the SQNMS may have been very large, and therefore, synchronization of SQN is not performed for authentication of the group call, and the PTT server maintains an SQN value for each group.

In step 103, the PTT server transmits a group call establishment message to the SRNC/eNB, wherein the message carries the AV generated by the PTT server in step 102, which comprises AUTN and RAND.

It should be noted that in addition to the embodiment of the present invention, the authentication of the calling user of the PTT system may also use the authentication process of the public network. However, in order to accelerate the speed of the group call establishment, in the present embodiment, the authentication is placed in the group call establishment response.

In step 104, the SRNC/eNB transmits the group call establishment response message to the group call calling terminal, wherein the message includes resources such as link layer, physical channel etc. allocated to the group call calling user, and the authentication parameters AUTN and RAND generate by the PTT server in step 102.

After receiving the authentication parameters, the group call calling user performs an authentication process. As shown in FIG. 2, the USIM card acquires the PTT authentication key K value as the incoming parameters of the f1-f5 functions according to the indication of $K_{id}$ in the authentication parameters, and calculates AK, IK, CK, XMAC, and RES, and compares whether the XMAC is equal to MAC in AUTN, and if so, the terminal stores the CK and IK generated by authentication as the key used in the group call; and if not, the terminal replies a failure message, and the group call fails at this time.

In step 105, after the calling terminal successfully performs authentication and configures the group call resources, the calling terminal replies a group call establishment completion message to the SRNC/eNB.

In step 106, the SRNC/eNB transmits the group call establishment completion message to the PTT server, wherein the message includes the RES calculated by the calling terminal.

The PTT server compares the XRES which is calculated before with the RES calculated by the calling terminal in the received group call establishment completion message, and if they are the same, the group call flow is established successfully, and meanwhile, the PTT server transmits the authentication vector to the SRNC/eNB where the group call called user is located, and if the XRES is different from the RES, the PTT server transmits a command to remove the group call.

Figure 4:
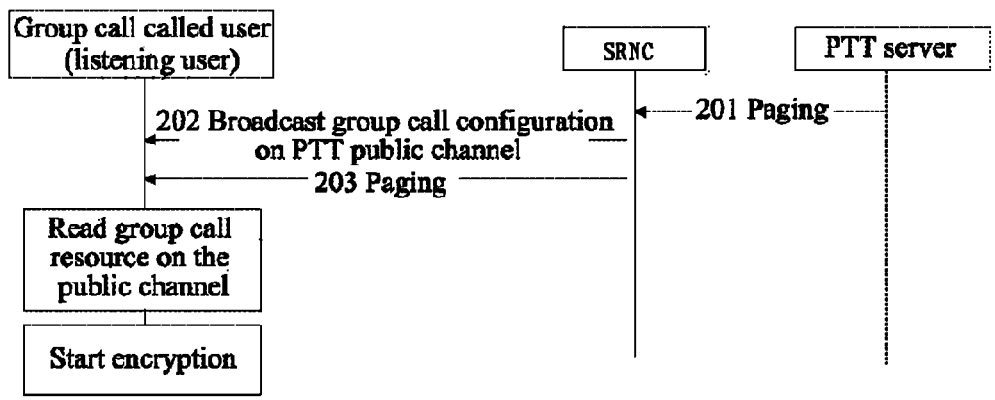
FIG. 4 is a diagram of a group call called process according to an embodiment of the present invention.

After the above group call establishment process of the group call calling user is successful, the PTT server initiates a group call called process, as shown in FIG. 4, which includes the following implementation steps.

In step 201, the PTT server determines a paging transmission range according to a location area where the group call called terminal is located, notifies an SRNC/eNB in the range, and transmits authentication parameters AUTN and RAND which are transmitted to the group call calling user to the SRNC/eNB.

In step 202, the SRNC/eNB broadcasts configuration of the current group call listening state on a pre-assigned PTT dedicated public channel of all cells, the configuration including link layer, physical resources, and authentication parameters AUTN and RAND in AV sent by the PTT server. The pre-assigned PTT dedicated public channel configuration may be read in the system information.

The group call called terminal only accepts group call downlink data, and the signaling of the called terminal is transmitted on the public channel. The signaling on the public channel is not encrypted and decrypted. The SRNC/eNB notifies the terminal on the PTT dedicated public channel whether the current group call is encrypted, and if so, it needs to notify each RB of the HFN value which should be used currently.

In step 203, the RNC/eNB transmits a paging message to terminals belonging to the group, including users in an idle state, group call listening state, talking state, and a single-call state.

After the group call called terminal receives the paging, if it needs to enter the group call listening state, the terminal actively reads the authentication vector of the group call on the public channel, and performs the authentication process shown in FIG. 2. The synchronization of SQN in the authentication process of the public network will not be performed here. If the calculated XMAC is the same as the MAC, the group call called terminal becomes the group call listening user, and starts to receive the group call data, and if the calculated XMAC is not the same as the MAC, the group call called terminal does not enter the new group call, and falls back to the previous state.

As all group call called parties share the downlink channel, the group call called terminals may not reply an authentication response message to the network, and the SRNC/eNB will not perform comparison between the XRES of the group call called parties and the RES, to avoid network congestion due to simultaneous random access, and accelerate the speed of the PTT group call establishment at the same time.

For the group call terminals under the LTE system, after calculating CK and IK through authentication, intermediate parameters Kasme and KeNB of the key as well as CK and IK of the Non-Access-Stratum (NAS) and the Radio Resource Control (RRC) layer continue to be calculated according to the method indicated in the Annex A of 3gpp protocol 33.401. It should be noted that in each group call, a new key is generated through authentication, and when KeNB is calculated, an incoming parameter Uplink Nas COUNT has a value of 0, and thus, it can ensure that the keys generated by the group call terminals are the same.

Figure 5:
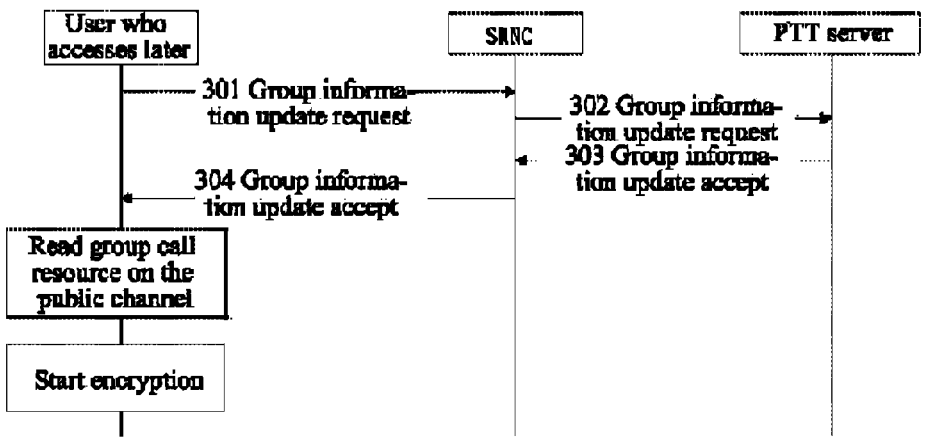
FIG. 5 is a diagram of a group call delayed access process according to an embodiment of the present invention.

For the terminal which accesses later, including a terminal which is in a power-off state and a terminal which is not in the group call service area when the group call is established, the flow of entering the group call listening state and starting encryption is shown in FIG. 5, which comprises the following steps.

In step 301, after the terminal is started or enters a PTT service area, after establishment of the Radio Resource Control (RRC) connection is successful, the terminal transmits a group information update request to the SRNC/eNB, wherein the request includes a UE identity of the terminal.

In step 302, the SRNC/eNB transmits the group information update request of the terminal to the PTT server.

In step 303, the PTT server judges the group to which the terminal belongs according to the UE identity of the terminal, and transmits a group information update accept message to the SRNC/eNB, wherein the message includes the identity of the group to which the terminal belongs. This step represents that the UE has completed registration in the PTT domain, and the PTT server achieves group call paging of the terminal according to the information.

In step 304, the SRNC/eNB transmits the group information update accept message to the terminal, after the terminal receives the group information update accept message, the terminal reads the PTT dedicated public channel to acquire the information of the group call to which it belongs. The information includes the downlink physical channel of the group call, the link layer configuration, and authentication parameters AUTN and RAND in the AV. The authentication process of the terminal which accesses later is the same as that of the above group call called user. After the authentication of the terminal is successful, the terminal directly enters the group call listening state.

When the user who accesses later under the UMTS system reads that the group call information on the public channel which indicates that encryption is needed, decryption is directly started. The COUNT-C of the RB is initialized with the HFN value of the RB broadcast on the public channel. The SN part of the COUNT-C of the RB in the UM mode is set to 0, and the CFN part of the COUNT-C of the RB in the TM mode is set to the current CFN. After receiving the downlink data packet, the maintenance method of the COUNT-C is the same as the existing method of the UMTS, and the specific manner may be known with reference to 3gpp protocols 25.331, 25.321 and 25.322.

When the group call information on the public channel indicates that encryption is needed, the user under the LTE system directly initializes the COUNT-C with the HFNs on various RBs notified on the public channel, and the SN part is set to 0. When the downlink data packet is received, the maintenance method of the COUNT-C is the same as the existing method of the LTE system. The specific manner may be known with reference to 3gpp protocol 36.323.

Figure 6:
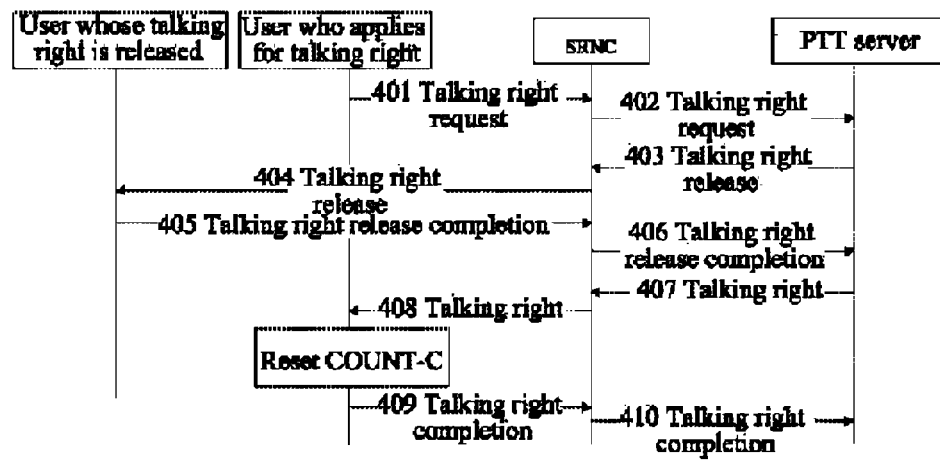
FIG. 6 is a diagram of a talking right application process according to an embodiment of the present invention.

As shown in FIG. 6, the flow of applying for a talking right includes the following implementation steps:

In step 401, the group call listening user transmits a talking right request message to the SRNC/eNB on the public channel, wherein the message includes a UE identity of the terminal and a group identity which needs to apply for a talking right.

In step 402, the SRNC/eNB transmits a talking right request message to the PTT server.

In step 403, the PTT server judges that the talking right may be allocated to the user, and if there is no talking-state user at this time, proceed to step 407, and if there is a talking-state user at this time, the PTT server firstly transmits a talking right release message to the SRNC/eNB where the talking-state user is located.

In step 404, the SRNC/eNB where the talking-state user is located transmits a talking right release message to the talking-state user.

In step 405, after the talking-state user replies a talking right release complete message, the talking-state user reads the encrypted parameters on the PTT public channel, and performs an encryption start-up process of the terminal which accesses later, without re-calculating the cipher key.

In step 406, the SRNC/eNB transmits a talking right release complete message to the PTT server.

In step 407, the PTT server transmits a talking right message to the SRNC/eNB where the talking right application terminal is located.

In step 408, the SRNC/eNB transmits a talking right message to the terminal, which includes uplink and downlink COUNT-C of each RB. After the terminal receives the talking right message, the terminal resets the uplink and downlink COUNT-C of the local RB with the COUNT-C value in the message, and then starts encryption and decryption immediately. As the talking right application and talking right message of the listening user are transmitted and received on the public channel through random access, the two messages need not to be encrypted and decrypted. It should be noted that the state variable of the terminal link layer entity which acquires the talking right needs to be synchronized with the state variable of the peer layer entity, and in particular, the entity which confirms the mode needs to perform synchronization. It may be reset as an initial value 0 as appointed, or may also be initialized using a value designated by the network side which is carried in the talking right message.

In step 409, the terminal replies a talking right complete message to the SRNC/eNB.

In step 410, the SRNC/eNB transmits a talking right complete message to the PTT server.

Under the UMTS system, when the listening user performs an SRNC relocation process, it needs to read the downlink encryption parameters from the public channel, and the parameter initialization process is the same as that of the user who accesses later.

When the talking user performs an SRNC relocation process, the synchronization of the encryption parameters is the same as that of the UMTS system.

Under the LTE mode, when the user moves to other eNBs, the Next Hop (NH) parameters are recalculated iteratively using the Next Hop Chaining Counter (NCC) allocated by the network side in accordance with the requirements of the existing protocol, and then a new KeNB is calculated, thereby acquiring the new CK and IK. The PTT server may maintain an NCC variable for each group call, and issue the new {NCC, NH} through the handover process of the calling user. The more complex method is that after each listening user moves to the other eNBs, a RRC connection may also be established to notify the PTT server, and the PTT server sends the new {NCC, NH}. The easier method is that in the whole group call process, the NCC is not replaced.

When the new {NCC, NH} is generated, the new NCC value may be broadcast by the eNB on the PTT dedicated public channel, or a change message of the NCC value may be sent by the eNB through the public channel, and after perceiving the change of the NCC, the listening user iteratively calculates a new key, and the eNB further needs to appoint to replace with the new key from a particular SN.

With the schemes according to the embodiments of the present invention, the encryption of the PTT system based on the security mechanism of the public network can be achieved, and drawbacks in the related art that that the encryption of the PTT system depends on the private encryption algorithm which has a low intensity, the key is transmitted via an air interface, and the replacement of the key is not in time are solved, thereby largely improving the security of the PTT system.

A person having ordinary skill in the art should understand that all or a part of the steps in the above method can be implemented by programs instructing related hardware, and the programs can be stored in a computer readable storage medium, such as a read-only memory, a disk, or a disc etc. Alternatively, all or a part of the steps in the aforementioned embodiments can also be implemented with one or more integrated circuits. Accordingly, various modules/units in the aforementioned embodiments can be implemented in a form of hardware, or can also be implemented in a form of software functional modules. The present invention is not limited to any particular form of combination of hardware and software.

The above description is only the preferable embodiments of the present invention, and the patent scope of the present invention is not limited to the above description. Equivalent structures or equivalent flow transforms made using the contents in the specification and accompanying drawings of the present invention, which are directly or indirectly applied to other related technical fields, should similarly be included in the patent protection scope of the present invention.

INDUSTRIAL APPLICABILITY

With the method and system according to the embodiments of the present invention, the encryption of the PTT system based on the security mechanism of the public network can be achieved, and drawbacks in the related art that that the encryption of the PTT system depends on the private encryption algorithm which has a low intensity, the key is transmitted via an air interface, and the replacement of the key is not in time are solved, thereby largely improving the security of the PTT system.

What is claimed is:

1. An encryption realization method, wherein, comprising:
   a push-to-talk (PTT) server and a group call terminal maintaining the same list of PTT authentication key K values respectively;
   during each group call, the PPT server calculating an authentication vector (AV) using public network authentication functions with input parameters of a generated random number (RAND), an authentication sequence number (SQN), and a PTT authentication key K value selected from the list of PTT authentication key K values;
   a serving radio network controller (SRNC) or an evolved NodeB (eNB) transmitting the RAND, the SQN and the authentication vector generated by the PTT server to the group call terminal; and
   the group call terminal, according to the RAND and an authentication token (AUTN) in the AV acquired from the PPT server, executing authentication to generate a cipher key (CK).

2. The method according to claim 1, wherein, the group call terminal comprises a talking-state terminal and a listening-state terminal, which share a downlink dedicated physical channel and have the same link layer resource configuration, and an uplink dedicated physical channel is allocated to the talking-state terminal of the PTT group call.

3. The method according to claim 2, wherein, the listening-state terminal only receives a downlink service and signaling data on an unacknowledge mode radio bearer (UM RB) on the downlink dedicated physical channel, and can also receive service data in a transparent transmission mode for a universal mobile telecommunications system (UMTS), and uplink signaling of the listening-state terminal is transmitted on a public channel which is not encrypted and decrypted.

4. The method according to claim 1, further comprising:
   the group call calling user transmitting a group call establishment request to a PTT server;
   after receiving the group call establishment request transmitted by the group call calling user, the PTT server generating parameters required for a public network authentication algorithm for the group call, wherein, the parameters comprise the RAND, the SQN, and a K value randomly selected from the list of PTT authentication key K values; and calculating the AV using the public network authentication functions f1-f5 and transmitting the AV and an identity ($K_{id}$) of the selected K value to a serving radio network controller (SRNC) or an evolved NodeB (eNB) of the group call calling user;
   the SRNC or the eNB transmitting the $K_{id}$ of the K value, the RAND, and the AUTN in the AV to the group call calling user; and
   the group call calling user generating the CK according to the received $K_{id}$, RAND, and AUTN in the AV.

5. The method according to claim 4, further comprising:
   the PTT server determining a page transmission range according to a location area where the group call called user is located, notifying a radio network controller (RNC) or eNB in the range, and transmitting the $K_{id}$, the RAND, and the AUTN in the AV which are transmitted to the group call calling user to the SRNC or eNB;
   the SRNC or eNB broadcasting configuration of a current group call listening state on a pre-assigned PTT dedicated public channel of all cells, wherein, the configuration comprises link layer resource, physical resource, the RAND, and the AUTN in the AV sent by the PTT server; and
   after receiving a page, and when judging that it needs to enter the group call listening state, the group call called user actively reading the $K_{id}$ and the AUTN in the AV of the group call calling user on the public channel, and performing authentication and generating the CK.

6. The method according to claim 4, further comprising:
   a group call called user, which is in a power-off state or a state of being not in a group call service area when the group call is established, entering a group call listening state and starting encryption;
   wherein, the step of the group call called user which is in the power-off state or the state of being not in a group call service area entering the group call listening state and starting encryption comprises:
   after the group call called user, which is in the power-off state or the state of being not in a group call service area when the group call is established, is powered on or enters a PTT service area, transmitting a group information update request to the PTT server to acquire an identity of a group call to which the terminal belongs, and when the group call called user determines that it needs to answer a particular group call, reading the PTT dedicated public channel and acquiring information of the group call to which it belongs, wherein, the information of the group call to which it belongs comprises a downlink physical channel of the group call, the link layer resource, the $K_{id}$, the RAND and the AUTN in the AV, and performing authentication based thereon.

7. The method according to claim 1, wherein, decryption parameters of all listening user terminals in the same group call are the same, and when authentication is performed, in addition to generating the same CK, synchronization of an encryption counter (COUNT-C) value of every listening user terminal needs to be ensured; and
   the method further comprises:
   the SRNC or eNB updating a hyper frame number (HFN) value of the downlink COUNT-C of a RB in real time; and the SRNC or eNB broadcasting an encryption indication of a current group call on a PTT dedicated public channel, to notify a group call called user whether the group call needs to be encrypted.

8. The method according to claim 7, wherein,
   when deciding to enter a listening state, the group call called user reading encryption parameters comprising the encryption indication of the group call, the HFN, the encryption algorithm on the PTT dedicated public channel;
   when the encryption indication is no encryption, not starting an encryption flow; and
   when the encryption indication is starting encryption, initializing the COUNT-C using the downlink HFN of the RB broadcasted, setting a serial number (SN) to 0, and a connection frame number (CFN) part of an integrity protection counter (COUNT-I) of the RB in a transparent transmission mode in a UMTS system using a current CFN.

9. A network-side device, comprising: a push-to-talk (PTT) server,
and a serving radio network controller (SRNC) or an evolved NodeB (eNB), wherein, the PTT server is configured to: maintain a list of PTT authentication key K values, generate a random number (RAND) and an authentication serial number (SQN), and during each group call, calculate an authentication vector (AV) using public network authentication functions with input parameters of the RAND, the SQN, and a PTT authentication key K value selected from the list of PTT authentication key K values, wherein the list of PTT authentication key K values is the same as that maintained by a group call terminal; and
the SRNC or eNB is configured to transmit the RAND, the SQN and the authentication vector generated by the PTT server to the group call terminal.

10. The network-side device according to claim 9, wherein,
the PTT server is configured to: after receiving a group call establishment request transmitted by a group call calling user, generate parameters required for a public network authentication algorithm for the group call, wherein, the parameters comprise the RAND, the SQN, and a K value randomly selected from the list of PTT authentication key K values, and calculate the AV using the public network authentication functions f1-f5 and transmit the AV and an identity ($K_{id}$) of the selected K value to the SRNC or eNB; and
the SRNC or eNB is configured to transmit the acquired $K_{id}$ of the K value, the RAND, and an authentication token (AUTN) in the AV to the group call calling user.

11. The network-side device according to claim 9, wherein,
the PTT server is further configured to: after a group call calling flow is successful, determine a page transmission range according to a location area where a group call called user is located, notify a radio network controller (RNC) or eNB in the range, and transmit the Kid, the RAND, and the AUTN in the AV which are transmitted to the group call calling user to the SRNC or eNB; and
the SRNC or eNB is further configured to broadcast configuration of a current group call listening state on a pre-assigned PTT dedicated public channel of all cells, wherein, the configuration comprises link layer resource, physical resource, the RAND, and the AUTN in the AV sent by the PTT server.

12. The network-side device according to claim 9, wherein,
the SRNC or eNB is further configured to: update an HFN value of a downlink COUNT-C of an RB in real time; and broadcast an encryption indication of the current group call on the PTT dedicated public channel, to notify the group call called user whether the group call needs to be encrypted.

13. A group call terminal, wherein, configured to:
maintain a list of push-to-talk (PTT) authentication key K values, and according to a generated random number (RAND) and an authentication token (AUTN) in an authentication vector (AV) acquired from a PTT server, perform authentication to generate an cipher key (CK); and wherein, the list of PTT authentication key K values is the same as that maintained by a PTT server, the PPT server calculates the authentication vector (AV) using public network authentication functions with input parameters of a generated random number (RAND), an authentication sequence number (SQN), and a PTT authentication key K value selected from the list of PTT authentication key K values, a serving radio network controller (SRNC) or an evolved NodeB (eNB) transmits the RAND and the authentication vector to the group call terminal.

14. The group call terminal according to claim 13, wherein,
the group call terminal comprises a talking-state terminal and a listening-state terminal, which share a downlink dedicated physical channel and have the same link layer configuration, and an uplink dedicated physical channel is allocated to the talking-state terminal of the PTT group call.

15. The group call terminal according to claim 14, wherein,
the listening-state terminal only receives a downlink service and signaling data on an unacknowledge mode radio bearer (UM RB) on the downlink dedicated physical channel, and can also receive service data in a transparent transmission mode for a universal mobile telecommunications system (UMTS), and uplink signaling of the listening-state terminal is transmitted on a public channel which is not encrypted and decrypted.

16. The group call terminal according to claim 13, comprising a group call calling user and a group call called user, wherein,
the group call calling user is configured to generate the CK according to the received $K_{id}$, RAND, and the AUTN in the AV; and
the group call called user is configured to: when determining to enter a group call listening state, actively read the $K_{id}$, the RAND and the AUTN in the AV of the group call calling user on a public channel, perform authentication, and generate the CK.

17. The group call terminal according to claim 16, wherein,
the group call called user is further configured to: after being powered on or entering a PTT service area, transmit a group information update request to a PTT server to acquire an identity of a group call to which the terminal belongs, and when the terminal determines that it needs to answer a particular group call, read the PTT dedicated public channel, and acquire information of the group call to which it belongs, wherein, the information of the group call to which it belongs comprises a downlink physical channel, link resource configuration, the $K_{id}$, the RAND and the AUTN in the AV of the group call; and perform authentication based thereon.

18. The group call terminal according to claim 13, wherein,
decryption parameters of all listening user terminals in the same group call are the same, and when authentication is performed, in addition to generating the same CK, synchronization of an encryption counter (COUNT-C) value of every listening user terminal needs to be ensured.

19. The group call terminal according to claim 13, wherein,
the group call called user is further configured to: when deciding to enter a listening state, read encryption parameters comprising an encryption indication of the group call, a hyper frame number (HFN), an encryption algorithm on the PTT dedicated public channel;

when the encryption indication is no encryption, not start an encryption flow; and when the encryption indication is starting encryption, initialize a COUNT-C using the downlink HFN of a RB broadcasted, set a serial number (SN) to 0, and a connection frame number (CFN) part of an integrity protection counter (COUNT-I) of the RB in a transparent transmission mode in a UMTS system uses a current CFN.

20. The method according to claim 5, further comprising:
a group call called user, which is in a power-off state or a state of being not in a group call service area when the group call is established, entering a group call listening state and starting encryption;

wherein, the step of the group call called user which is in the power-off state or the state of being not in a group call service area entering the group call listening state and starting encryption comprises:

after the group call called user, which is in the power-off state or the state of being not in a group call service area when the group call is established, is powered on or enters a PTT service area, transmitting a group information update request to the PTT server to acquire an identity of a group call to which the terminal belongs, and when the group call called user determines that it needs to answer a particular group call, reading the PTT dedicated public channel and acquiring information of the group call to which it belongs, wherein, the information of the group call to which it belongs comprises a downlink physical channel of the group call, the link layer resource, the $K_{id}$, the RAND and the AUTN in the AV, and performing authentication based thereon.

* * * * *